(12) United States Patent
Nishida et al.

(10) Patent No.: US 7,205,748 B2
(45) Date of Patent: Apr. 17, 2007

(54) CHARGING CIRCUIT FOR SECONDARY BATTERY

(75) Inventors: Junji Nishida, Osaka (JP); Shinya Manabe, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/259,186

(22) Filed: Oct. 26, 2005

(65) Prior Publication Data

US 2006/0043932 A1    Mar. 2, 2006

Related U.S. Application Data

(63) Continuation of application No. 10/467,682, filed on Oct. 16, 2003, now Pat. No. 7,012,405.

(51) Int. Cl.
*H02J 7/00*    (2006.01)
(52) U.S. Cl. ...................... 320/137; 320/139
(58) Field of Classification Search ............... 320/129, 320/135, 137, 139, 141, 145
See application file for complete search history.

(56) References Cited

U.S. PATENT DOCUMENTS

| | | |
|---|---|---|
| 3,800,208 A | 3/1974 | Macharg |
| 4,350,946 A | 9/1982 | Prinsze |
| 4,385,269 A | 5/1983 | Aspinwall et al. |
| 4,462,363 A | 7/1984 | Nanjyo et al. |
| 4,609,861 A | 9/1986 | Inaniwa et al. |
| 5,241,258 A | 8/1993 | Cheon |
| 5,442,274 A | 8/1995 | Tamai |
| 5,589,757 A | 12/1996 | Klang |
| 5,637,981 A | 6/1997 | Nagai et al. |
| 5,654,622 A | 8/1997 | Toya et al. |
| 5,670,863 A | 9/1997 | Broell et al. |
| 5,747,969 A | 5/1998 | Tamai |
| 5,905,364 A | 5/1999 | Ookita |
| 6,028,415 A | 2/2000 | Nagai et al. |
| 6,094,034 A | 7/2000 | Matsuura |
| 6,124,700 A | 9/2000 | Nagai et al. |
| 6,137,265 A | 10/2000 | Cummings et al. |
| 6,218,811 B1 | 4/2001 | Tokuyama |

(Continued)

FOREIGN PATENT DOCUMENTS

JP          06113474          4/1994

(Continued)

*Primary Examiner*—Gary L Laxton
*Assistant Examiner*—Samuel Berhanu
(74) *Attorney, Agent, or Firm*—Dickstein Shapiro LLP

(57) ABSTRACT

A charging circuit for a secondary battery includes a constant-voltage circuit part outputting one of a plurality of predetermined constant voltages and charges the secondary battery by applying the constant voltage thereto, a detection circuit part detecting a battery voltage of the secondary battery, and a control circuit part controlling the selection of the constant-voltage in response to the detected battery voltage. Another charging circuit includes a constant-current circuit part outputting, to the secondary battery, one of two predetermined constant currents, a constant-voltage circuit part charging the secondary battery by applying a predetermined constant voltage thereto, a battery voltage detection circuit part detecting a battery voltage of the secondary battery, a charge current detection circuit part outputting a predetermined charge completion signal, and a charge control circuit part stopping operations of the constant-current circuit part and constant-voltage circuit part when receiving the charge completion signal.

13 Claims, 9 Drawing Sheets

| U.S. PATENT DOCUMENTS | | | | FOREIGN PATENT DOCUMENTS | | |
|---|---|---|---|---|---|---|
| 6,229,286 B1 | 5/2001 | Tokuyama | JP | 07336908 | 12/1995 |
| 6,236,194 B1 | 5/2001 | Manabe et al. | JP | 2000092737 | 3/2000 |
| 6,307,353 B1 | 10/2001 | Shiojima | JP | 2001186684 | 7/2001 |
| 6,392,384 B1 | 5/2002 | Hwang Bo et al. | JP | 2003-85210 | 3/2003 |
| 6,553,263 B1 | 4/2003 | Meadows et al. | | | |

CHARGING CIRCUIT FOR SECONDARY BATTERY

CROSS-REFERENCE TO RELATED APPLICATIONS

This is a continuation of U.S. patent application Ser. No. 10/467,682, filed Oct. 16, 2003, now U.S. Pat. No. 7,012,405 by Junji NISHIDA and Shinya MANABE, which is incorporated herein by reference.

TECHNICAL FIELD

The present invention generally relates to charging circuits for rechargeable secondary batteries, and more particularly to a charging circuit for a secondary battery that can quickly charge and avoid generation of noise in a frequency band having negative effect on equipment, such as a mobile phone, using the charging circuit.

BACKGROUND ART

As charging methods of a lithium ion battery, when divided roughly, a constant-current/constant-voltage charge method and a pulse charge method are used. In the constant-current/constant-voltage charge method, it is possible to shorten charging time by increasing the charging current for a lithium ion battery and by making the constant voltage applied to the lithium ion battery in charging a little higher than the full charge voltage of the battery. However, when the lithium ion battery is overcharged, there is a possibility that the performance of the battery is degraded. On the other hand, the pulse charge method causes little damage to the battery since an idle period is taken during the charging of the lithium ion battery.

As such pulse charge methods, there are three methods as follows.

As disclosed in Japanese Laid-Open Patent Application No. 6-113474, there is a first method that completes charging when the voltage in the idle period reaches a predetermined voltage.

There is a second method that makes conditions for starting the charging and suspending the charging, and repeats the charging and suspension of the charging under the conditions. The charging is completed when the charging suspension period lasts equal to or more than a predetermined time, or when the ratio of the charging period to the charging suspension period exceeds a predetermined value. For example, the charging is suspended when the voltage of the battery reaches a first voltage and the charging is restarted when the voltage falls to a second voltage during the charging.

As disclosed in Japanese Laid-Open Patent Application No. 7-336908, there is a third method that alternately repeats the charging at a high level voltage and a low level voltage and completes the charging when the charging current at the low level voltage is equal to or less than a predetermined current value.

However, in the above-described first method, there is a problem in that the charging time becomes longer compared with the constant-current/constant-voltage method. In addition, in the above-described second method, the charging time is shortened to some degree compared with the constant-current/constant-voltage method. However, since each of the charging period and the charging suspension period varies drastically between the start of the charging and just before the end of the charging, the frequency of switching the charging period and the charging suspension period varies over a wide range. Thus, there is a problem in that noise occurs over a wide frequency band.

Additionally, in the above-described third method, since current detection means for detecting the charging current at the low-level voltage is required, a current detection element is serially inserted in the charging circuit. Thus, there is a problem in that electric power loss occurs. Further, it is necessary to make the value of a current detecting resistance large so as to detect when the charging current is zero. Accordingly, there is another problem in that the electric power loss becomes greater, and at the same time, a complex circuit is required.

Further, generally, a secondary battery is used as a power source in mobile radio communication equipment such as a mobile phone. Especially, a lithium ion battery has a high energy density per unit area and per unit mass. Thus, it is possible to make equipment that includes a lithium ion battery smaller and lighter. When charging a lithium ion battery, the constant-voltage charge method that maintains a voltage of the battery to be constant, or the constant-current/constant-voltage charge method that performs constant-voltage charge after constant-current charge is employed. In a charging circuit, irrespective of the method applied thereto, charging is completed by detecting that the charging current is equal to or less than a predetermined full charge current during the constant-voltage charge.

In the following, a description will be given of a conventional charging circuit for a secondary battery. FIG. 4 is a diagram showing a conventional charging circuit for a secondary battery. In FIG. 4, the charging circuit includes an AC adapter 110, an adapter detection circuit 112 that detects that the AC adapter 110 is connected, a battery voltage detection circuit 116 that detects the voltage of a secondary battery 114 that is to be charged, a constant-voltage circuit 118 that performs constant-voltage charge on the secondary battery 114, a charge current detection circuit 122 that detects the charging current flowing to the secondary battery 114, a resistor R1 across which the charging current causes a voltage drop, a diode D1 that blocks a current from flowing from the secondary battery 114 to the AC adapter 110, and a charge control circuit 124 that performs drive control of the constant-voltage circuit 118. The AC adapter 110 is connected to a terminal 130. The constant-voltage circuit 118 includes a constant-voltage generation circuit 140 that generates a reference voltage BE1, a control transistor M1, and an operational amplifier A1. In addition, the charge current detection circuit 122 includes a constant-voltage generation circuit 142 that generates a reference voltage BE2 and an operational amplifier A2. Further, the adapter detection circuit 112 includes a constant-voltage generation circuit 144 that generates a reference voltage BE3 and an operational amplifier A3. The resistor R1 is connected between the AC adapter 110 and the control transistor M1. The diode D1 is connected between the control transistor M1 and the secondary battery 114.

In the following, a description will be given of the operation of this charging circuit. When the AC adapter 110 is connected to the charging circuit via the terminal 130, and the voltage of the AC adapter 110 is equal to or more than a predetermined value, the adapter detection circuit 112 outputs a predetermined signal Sg1 to the charge control circuit 124. In addition, the battery voltage detection circuit 116 detects the battery voltage of the secondary battery 114 and outputs a battery voltage signal Sg2. The charge control circuit 124 starts the operation when the signal Sg1 is input from the adapter detection circuit 112, and outputs a predetermined charge control signal Sg5 to the constant-voltage circuit 118. The constant-voltage circuit 118 starts the constant-voltage charge of the secondary battery 114 when the charge control signal Sg5 is input. While charging, the diode D1 prevents a current from flowing back to the AC adapter 110 from the secondary battery 114 via the control transistor M1 and the resistor R1. The charging current causes a voltage drop across the resistor R1, and the resulting voltage is applied to the charge current detection circuit 122. When the charge current detection circuit 122 detects from the input voltage that the charging current is lower than a predetermined value, the charge current detection circuit 122 sends a predetermined charge completion signal Sg6 to the charge control circuit 124. When the charge completion signal Sg6 is input to the charge control circuit 124, the charge control circuit 124 outputs the charge control signal Sg5 and stops the operation of the constant-voltage circuit 118.

As mentioned above, in order to detect the charging current, the conventional charging circuit uses the resistor R1. However, at the beginning of charging, the charging current is high and a sharp voltage drop results. Thus, heat generation of the resistor R1 becomes very high. In addition, power loss due to the heat generation is also great. In order to reduce such heat generation and waste of power, it is conceivable to make the resistance value of the resistor R1 small. However, by performing the constant-voltage charge, the current when charge complete is detected is small, and since the voltage drop across the resistor R1 is low, an input offset voltage of the operational amplifier A1 detecting the generated voltage is not negligible. In other words, there is a problem in that the accuracy of detecting the charging current is deteriorated. Further, there is also a problem in that, since operational amplifiers having a small offset voltage are expensive, the manufacturing cost increases when using them.

Furthermore, a problem occurs when a large current is supplied to the secondary battery at the beginning of charging in a case where the secondary battery is in an over-discharged state. Accordingly, it is impossible for such a charging circuit to charge the secondary battery that is in an over-discharged state.

DISCLOSURE OF THE INVENTION

It is a general object of the present invention to provide an improved and useful charging circuit for a secondary battery in which the above-mentioned problems are solved.

A more specific object of the present invention is to provide a charging circuit for a secondary battery that is a simple circuit, capable of shortening the charging time, and at the same time, capable of avoiding generation of noise in a frequency band adversely affecting equipment using the charging circuit.

Another object of the present invention is to provide a charging circuit that can detect a full charge state of the secondary battery with high accuracy, small heat generation and small power loss.

Another and more specific object of the present invention is to provide a charging circuit that can reduce the manufacturing cost.

Still another object of the present invention is to provide a charging circuit that can also charge the secondary battery that is in an over-discharged state.

In order to achieve the above-mentioned objects, according to one aspect of the present invention, there is provided a charging circuit for a secondary battery including: a constant-voltage circuit part that selects and outputs one constant voltage among a plurality of predetermined constant-voltages in response to an input control signal and charges the secondary battery by applying the selected constant voltage thereto; a detection circuit part that detects a battery voltage of the secondary battery; and a control circuit part that controls the selection of a constant voltage applied from the constant-voltage circuit part in response to the detected battery voltage from the detection circuit part, the control circuit part causing the constant-voltage circuit part to charge the secondary battery by applying a predetermined first constant voltage thereto when the battery voltage of the secondary battery is equal to or less than the first constant voltage, and to charge the secondary battery by alternately applying thereto a predetermined second constant voltage and a predetermined third constant voltage that is lower than the second constant voltage in a constant cycle when the battery voltage of the secondary battery exceeds the first constant voltage.

According to the above-mentioned aspect of the present invention, it is possible to charge the secondary battery with a high current, since the constant-voltage charge is performed before the pulse charge. In addition, even after the pulse charge is started, the charging is performed by switching from/to a high-level constant-voltage to/from a low-level constant-voltage in a constant cycle (switching cycle). Thus, since the charging current continues, it is possible to shorten the charging time. At the same time, it is also possible to set the switching cycle to a frequency that does not adversely affect equipment using the charging circuit.

Additionally, according to another aspect of the present invention, the control circuit part detects completion of charging of the secondary battery and performs a predetermined charge complete operation, when the battery voltage of the secondary battery exceeds a predetermined charge complete voltage, while causing the constant-voltage circuit part to apply the third constant-voltage to the secondary battery.

According to the above-mentioned aspect of the present invention, it is possible to positively avoid over-charging.

Additionally, according to another aspect of the present invention, the second constant-voltage may be equal to the first constant-voltage.

According to the above-mentioned aspect of the present invention, it is possible to simplify the circuit and to charge the secondary battery so as not to damage the secondary battery.

Additionally, according to another aspect of the present invention, the second constant-voltage may be higher than the first constant-voltage.

According to the above-mentioned aspect of the present invention, it is possible to shorten the charging time without damaging the secondary battery, by making the high level voltage during the pulse charge a little higher than the full charge voltage.

Additionally, according to another aspect of the present invention, the charging circuit may further include a load circuit part that connects a load in parallel with the secondary battery according to the third constant-voltage output from the constant-voltage circuit part.

According to the above-mentioned aspect of the present invention, it is possible to stabilize the battery voltage of the secondary battery that is charged with the third constant voltage during the pulse charge. Thus, detection errors of the charge complete voltage can be reduced. In addition, the flexibility of the cycle of the pulse charge can be increased.

Accordingly, it is possible to set the cycle to a frequency that does not give a negative influence to equipment using the charging circuit.

According to another aspect of the present invention, the constant-voltage circuit part may include a constant-voltage generation circuit that generates and outputs the first constant voltage, the second constant voltage and the third constant-voltage; a voltage switch circuit that, according to the control signal from the control circuit part, selects and outputs one of the first constant-voltage, the second constant voltage and the third constant voltage output from the constant-voltage generation circuit; a voltage comparator that compares the constant voltage output from the voltage switch circuit with the battery voltage of the secondary battery and outputs a comparison signal according to a comparison result; a control transistor that passes a current according to the comparison signal from a predetermined direct-current power source to the secondary battery; and a diode that blocks a current flowing from the secondary battery to the predetermined direct-current power source via the control transistor.

According to the above-mentioned aspect of the present invention, it is possible to charge the secondary battery by switching from the constant-voltage charge to the pulse charge and with a simple circuit construction.

Additionally, according to another aspect of the present invention, there is provided a charging circuit charging a secondary battery including: a constant-current circuit part that is serially connected between an external direct-current power source and the secondary battery, and outputs, to the secondary battery, one of first and second constant currents in response to an input control signal; a constant-voltage circuit part that is connected in parallel with the constant-current circuit part, and charges the secondary battery by applying a predetermined constant voltage thereto; a battery voltage detection circuit part that detects and outputs a battery voltage of the secondary battery; a charge current detection circuit part that outputs a predetermined charge completion signal when the constant-voltage circuit part stops outputting a current; and a charge control circuit part that stops operations of the constant-current circuit part and the constant-voltage circuit part when the charge completion signal is input, wherein, when the battery voltage of the secondary battery is lower than a predetermined voltage, the charge control circuit part outputs, to the constant-current circuit part, the control signal to cause the constant-current circuit part to output the first constant current, and when the battery voltage of the secondary battery is equal to or greater than the predetermined voltage, the charge control circuit part outputs, to the constant-current circuit part, the control signal to cause the constant-current circuit part to output the second constant current that is greater than the first constant current.

Further, according to another aspect of the present invention, there is provided a charging circuit charging a secondary battery including: a constant-voltage circuit part that is connected between an external direct-current power source and the secondary battery, and charges the secondary battery by applying a predetermined constant-voltage thereto; a battery voltage detection circuit part that detects and outputs a battery voltage of the secondary battery; a charge current detection circuit part that outputs a predetermined charge completion signal when a current output from said constant-voltage circuit part becomes a predetermined value; and a charge control circuit part that stops an operation of said constant-voltage circuit part when the predetermined charge completion signal is input, said constant-voltage circuit part including: a constant-voltage generation circuit that generates and outputs the predetermined constant voltage; a voltage comparator that compares the battery voltage of the secondary battery with the predetermined constant voltage, and outputs a comparison signal indicating a comparison result; and a control transistor that passes a current according to the comparison signal indicating the comparison result from the external direct-current power source to the secondary battery, and said charge current detection circuit part detecting the comparison signal output from said voltage comparator, and outputs the predetermined charge completion signal by determining, from the detected comparison signal, that the current passed by said control transistor is a predetermined value.

According to the above-mentioned aspects of the present invention, the charging is completed by detecting, without a resistor, the charging current output from the constant-voltage circuit. Thus, there is no heat generation and no power loss due to the resistor. Accordingly, it is possible to detect the full charge state of the secondary battery with high accuracy.

In addition, according to the above-mentioned aspects of the present invention, in a case where the battery voltage of the secondary battery is lower than the predetermined voltage, it is possible to charge the secondary battery with a current having an amount suitable for such a case. Thus, it is possible to charge the secondary battery in an over-discharged state. Furthermore, the above-mentioned charging circuit can be realized while restraining the increase in the size of the circuit. Therefore, it is possible to reduce the manufacturing cost.

Other objects, features and advantages of the present invention will become more apparent from the following detailed description when read in conjunction with the following drawings.

BEST MODE FOR CARRYING OUT THE INVENTION

Next, a detailed description will be given of a first embodiment of the present invention, with reference to the drawings.

<First Embodiment>

Figure 1:
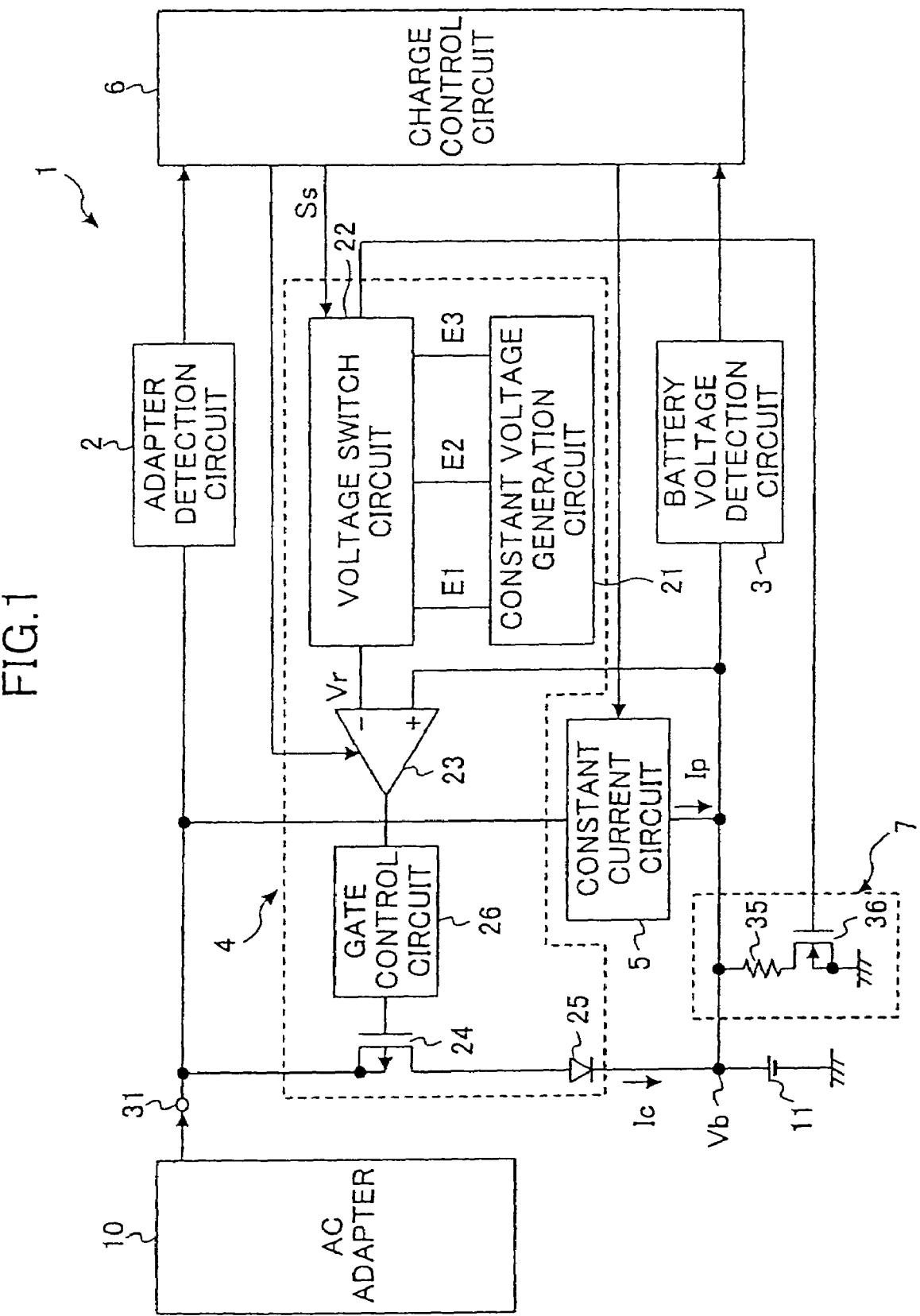
FIG. 1 is a diagram showing an example of the structure of a charging circuit for a secondary battery according to a first embodiment of the present invention.

FIG. 1 is a diagram showing an example of the structure of a charging circuit for a secondary battery in a first embodiment of the present invention. It should be noted that FIG. 1 shows the example of the charging circuit for a lithium ion battery used for a mobile phone.

In FIG. 1, a charging circuit 1 for a secondary battery includes an adapter detection circuit 2 that outputs a predetermined signal when a power supply voltage from an AC adapter 10 that is a direct-current power source is equal to or higher than a predetermined value, a battery voltage detection circuit 3 that detects and outputs a positive voltage (hereinafter referred to as a "battery voltage") Vb of a lithium ion battery 11 that is a secondary battery, and a constant-voltage circuit 4 that charges the lithium ion battery 11 at a constant-voltage.

Further, the charging circuit 1 includes a constant-current circuit 5 for precharging that precharges the lithium ion battery 11 with a predetermined constant-current, a charge control circuit 6 that, in response to a signal from the adapter detection circuit 2 and a detected voltage from the battery voltage detection circuit 3, causes the constant-voltage circuit 4 to perform charging of the pulse charge method on the lithium ion battery 11, and causes the constant-current circuit 5 to perform the precharging, and a load circuit 7 connected in parallel with the lithium ion battery 11.

In addition, the constant-voltage circuit 4 includes a constant-voltage generation circuit 21, a voltage switch circuit 22, an operational amplifier 23, a control transistor 24, a diode 25 and a gate control circuit 26. The constant-voltage generation circuit 21 generates and outputs three predetermined constant-voltages E1 through E3. The voltage switch circuit 22 selects one of the constant-voltages E1 through E3 from the constant-voltage generation circuit 21 according to a control signal from the charge control circuit 6 and outputs the selected one as a reference voltage Vr. The operational amplifier 23 operates as a voltage comparator, and a control transistor 24 that is a PMOS transistor performs supply control of the charging current from the AC adapter 10 on the lithium ion battery 11. The gate control circuit 26 performs operation control of the control transistor 24 according to an output signal from the operational amplifier 23. Further, the charge control circuit 6 operates as a control circuit. The constant-voltage E1 corresponds to a first constant-voltage, the constant-voltage E2 corresponds to a second constant-voltage, and the constant-voltage E3 corresponds to a third constant-voltage.

The control transistor 24, the diode 25 and the lithium ion battery 11 are serially connected between a power terminal 31 and ground so that the charging current is supplied to the lithium ion battery 11. The power terminal 31 is supplied with power by the AC adapter 10. The diode 25 serves to prevent a current from flowing back to the AC adapter 10 from the lithium ion battery 11, in a case where the voltage of the power terminal 31 is lower than the battery voltage Vb of the lithium ion battery 11.

The voltage switch circuit 22 selects one of the constant-voltages E1 through E3 according to a voltage switch signal Ss from the charge control circuit 6, and outputs the selected constant-voltage to an inverting input terminal of the operational amplifier 23. The battery voltage Vb of the lithium ion battery 11 is applied to a noninverting input terminal of the operational amplifier 23. An output terminal of the operational amplifier 23 is connected to a gate of the control transistor 24 via the gate control circuit 26. In addition, the driving of the operational amplifier 23 is controlled by the control signal from the charge control circuit 6.

On the other hand, the load circuit 7 is a series circuit including a resistor 35 and an NMOS transistor 36. The resistor 35 and the NMOS transistor 36 are serially connected between a positive electrode and ground. The NMOS transistor 36 operates in accordance with the constant-voltage selected by the voltage switch circuit 22. When the NMOS transistor 36 turns ON, the resistor 35 serves as a load to the control transistor 24 of the constant-voltage circuit 4. The constant-voltages E1 through E3 are in a relationship where the condition $E2 \geq E1 > E3$ is satisfied. When the voltage switch circuit 22 selects the constant-voltage E3 as the reference voltage Vr in response to the voltage switch signal Ss, the NMOS transistor 36 is turned ON. When the constant-voltage E1 or E2 is selected as the reference voltage Vr, the NMOS transistor 36 is turned OFF and assumes a shut-off state.

Figure 2:
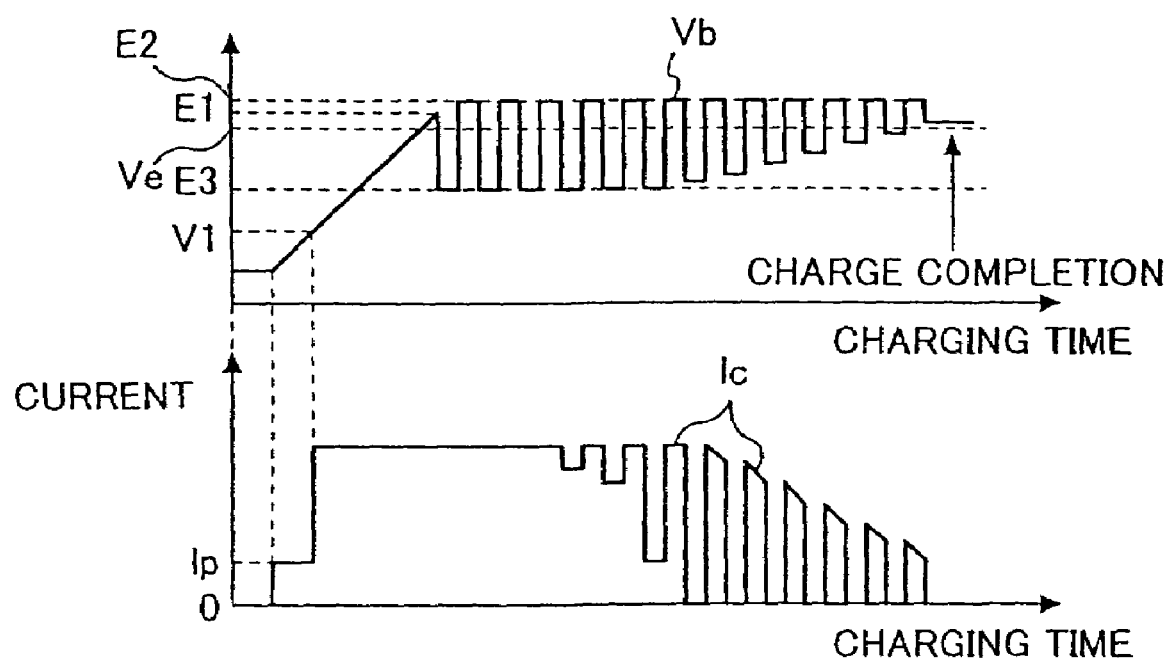
FIG. 2 is a timing chart showing an example of the operation of the charging circuit 1 in FIG. 1.

FIG. 2 is a timing chart showing an example of the operation of the charging circuit 1 shown in FIG. 1. A description will be given of an example of the operation of each part in FIG. 1, by referring to FIG. 2.

First, the charge control circuit 6 is activated when the AC adapter 10 supplies power and a predetermined signal is input from the adapter detection circuit 2. The battery voltage detection circuit 3 detects the battery voltage Vb of the lithium ion battery 11 and outputs the detected voltage value to the charge control circuit 6.

In a case where the battery voltage Vb of the lithium ion battery 11 is equal to or less than a predetermined value V1, the charge control circuit 6 activates the constant-current circuit 5 so that precharging of the lithium ion battery 11 with a predetermined precharging current is started. In addition, at this moment, the charge control circuit 6 stops the operation of the operational amplifier 23 so as to avoid the current flowing to the lithium ion battery 11 via the control transistor 24.

The above-mentioned predetermined value V1 may be set to approximately 2.5 V when the lithium ion battery 11 is a 4.2 V lithium ion battery, for example. This is because a problem may occur when the lithium ion battery 11 is suddenly charged by a large current in a case where the lithium ion battery 11 is in an over-discharged state. The precharging of the lithium ion battery 11 is performed such that the charging current is reduced when starting the charging. A precharging current Ip is a current for the precharging, and is generally set from a few to tens of milliamperes, approximately.

When the battery voltage Vb of the lithium ion battery 11 is raised to be the predetermined value V1, the charge control circuit 6 determines that the lithium ion battery 11 is a normal battery, ends the precharging by the constant-current circuit 5, and outputs the voltage switch signal Ss so as to switch the charging from the precharging to the constant-voltage charging by the constant-voltage circuit 4.

Further, when precharging, the operation of the constant-voltage circuit 4 is stopped, and the diode 25 prevents the current from flowing to the AC adapter 10 from the lithium ion battery 11.

When the precharging ends, the charge control circuit 6 causes the voltage switch circuit 22 to select the constant-voltage E1 by the voltage switch signal Ss. The selected constant-voltage E1 is output to the inverting input terminal of the operational amplifier 23 as the reference voltage Vr. The output voltage of the constant-voltage circuit 4 becomes the constant-voltage E1, and charges the lithium ion battery 11 with the constant-voltage E1. A charging current Ic when charging the lithium ion battery 11 with the constant-voltage E1 is as shown in FIG. 2. A constant-current limited by the current capacity of the AC adapter 10 or that of the control transistor 24 is output from the constant-voltage circuit 4 as the charging current Ic.

When the battery voltage Vb of the lithium ion battery 11 gradually increases and reaches the voltage E1 that is the same as the output voltage of the constant-voltage circuit 4, the charge control circuit 6 performs operation control on the constant-voltage circuit 4 so as to charge the lithium ion battery 11 by the pulse charge method. In addition, the constant-voltage E1 may be set to 4.2 V that is the full charge voltage in a case of the lithium ion battery.

The pulse charge method is a method that charges the lithium ion battery 11 by repeatedly switching the output voltage of the constant-voltage circuit 4 from/to the constant-voltage E2 to/from the constant-voltage E3 with a predetermined cycle. When the voltage of the lithium ion battery 11 reaches the voltage E1, the charge control circuit 6 outputs the voltage switch signal Ss to the voltage switch circuit 22 so that the voltage switch circuit 22 selects the constant-voltage E3, and sets the output voltage of the constant-voltage circuit 4 to the constant-voltage E3. The constant-voltage E3 is lower than the constant-voltage E1. However, the voltage of the constant-voltage E3 is set such that sufficient charging current Ic can be output to the lithium ion battery 11 immediately after the charge method is switched to the pulse charge method. For example, the constant-voltage E3 may be set from 4.0 V to 4.1 V in a case of the lithium ion battery.

Next, after a predetermined time T1 has elapsed since the charge control circuit 6 outputs the voltage switch signal Ss to the voltage switch circuit 22 so that the voltage switch circuit 22 selects the constant-voltage E3, the charge control circuit 6 outputs the voltage switch signal Ss to the voltage switch circuit 22 so that the voltage switch circuit 22 selects the constant-voltage E2. The voltage switch circuit 22 selects and outputs the constant-voltage E2 so that the output voltage of the constant-voltage circuit 4 becomes the constant-voltage E2. The constant-voltage E2 may be set to the same voltage as that of the constant-voltage E1, or to a voltage that is slightly greater than the constant-voltage E1 by approximately 0.1 V, for example. In addition, it should be noted that FIG. 2 shows a case where the constant value E2 is greater than the constant-voltage E1, for example.

In a case where the constant-voltage E2 is set to the same voltage as that of the constant-voltage E1, there is no possibility that an excess voltage is applied to the lithium ion battery 11. Thus, there is no danger of damaging the lithium ion battery 11. Further, since the constant-voltage E2 is set to the same voltage as that of the constant-voltage E1, the circuit may be simplified. However, there is a drawback in that the charging time becomes a little longer. In a case where the constant-voltage E2 is set a little greater than the constant-voltage E1, it is possible to shorten the charging time. At the same time, it is also possible to reduce the likelihood of damaging the lithium ion battery since the pulse charge method is employed.

Next, after the predetermined time T1 has elapsed since the charge control circuit 6 outputs the voltage switch signal Ss to the voltage switch circuit 22 so that the voltage switch circuit 22 selects the constant-voltage E2, the charge control circuit 6 outputs the voltage switch signal Ss to the voltage switch circuit 22 so that the voltage switch circuit 22 selects the constant-voltage E3 again. The voltage switch circuit 22 selects and outputs the constant-voltage E3 again so that the output voltage of the constant-voltage circuit 4 becomes the constant-voltage E3. In this way, the charge control circuit 6 causes the constant-voltage circuit 4 to output the constant-voltages E2 and E3 alternately in a constant cycle, until the charging of the lithium ion battery 11 is completed.

As can be seen from FIG. 2, immediately after the charge method is switched to the pulse charge method, the charging current Ic is approximately constant since the charging current Ic is a current limited by the current capacity of the AC adapter 10 or that of the control transistor 24, whether the output voltage of the constant-voltage circuit 4 is the constant-voltage E3 or the constant-voltage E2. However, as the lithium ion battery 11 is charged, the charging current Ic during the charging with the constant-voltage E3 is gradually decreased. Further, when the battery voltage Vb of the lithium ion battery 11 becomes equal to or more than the constant-voltage E3 as the lithium ion battery 11 is charged, the charging current Ic does not flow when charging with the constant-voltage E3. Such a method is similar to the general pulse charge method that repeats charging and suspension of charging. In such a charging method, it is possible to avoid damage to the lithium ion battery 11 and to extend the life of the lithium ion battery 11.

When the lithium ion battery 11 is further charged and the battery voltage Vb of the lithium ion battery 11 when charging with the constant-voltage E3 exceeds a predetermined charge complete voltage Ve, the charge control circuit 6 determines that the lithium ion battery 11 is completely charged, stops the operation of the operational amplifier 23 so as to stop the operation of the constant-voltage circuit 4, and stops the charging operation to the lithium ion battery 11.

The NMOS transistor 36 of the load circuit 7 is turned ON when the voltage switch circuit 22 selects the constant-voltage E3. When the NMOS transistor 36 is turned ON, the resistor 35 serves as the load to the constant-voltage circuit 4. Hence, when the output voltage of the constant-voltage circuit 4 is switched from the constant-voltage E2 to the constant-voltage E3, it is possible to shorten the time required for the battery voltage Vb of the lithium ion battery 11 to reach a stable voltage. Additionally, it is also possible to shorten the time required for the comparison with the charge complete voltage Ve performed by the charge control circuit 6. Therefore, it is possible to set the time for charging the lithium ion battery 11 with the constant-voltage E3 short. Thus, it is possible to increase the flexibility of setting the charging cycle of the pulse charge to a frequency that does not give an influence on equipment using the charging circuit.

Figure 3:
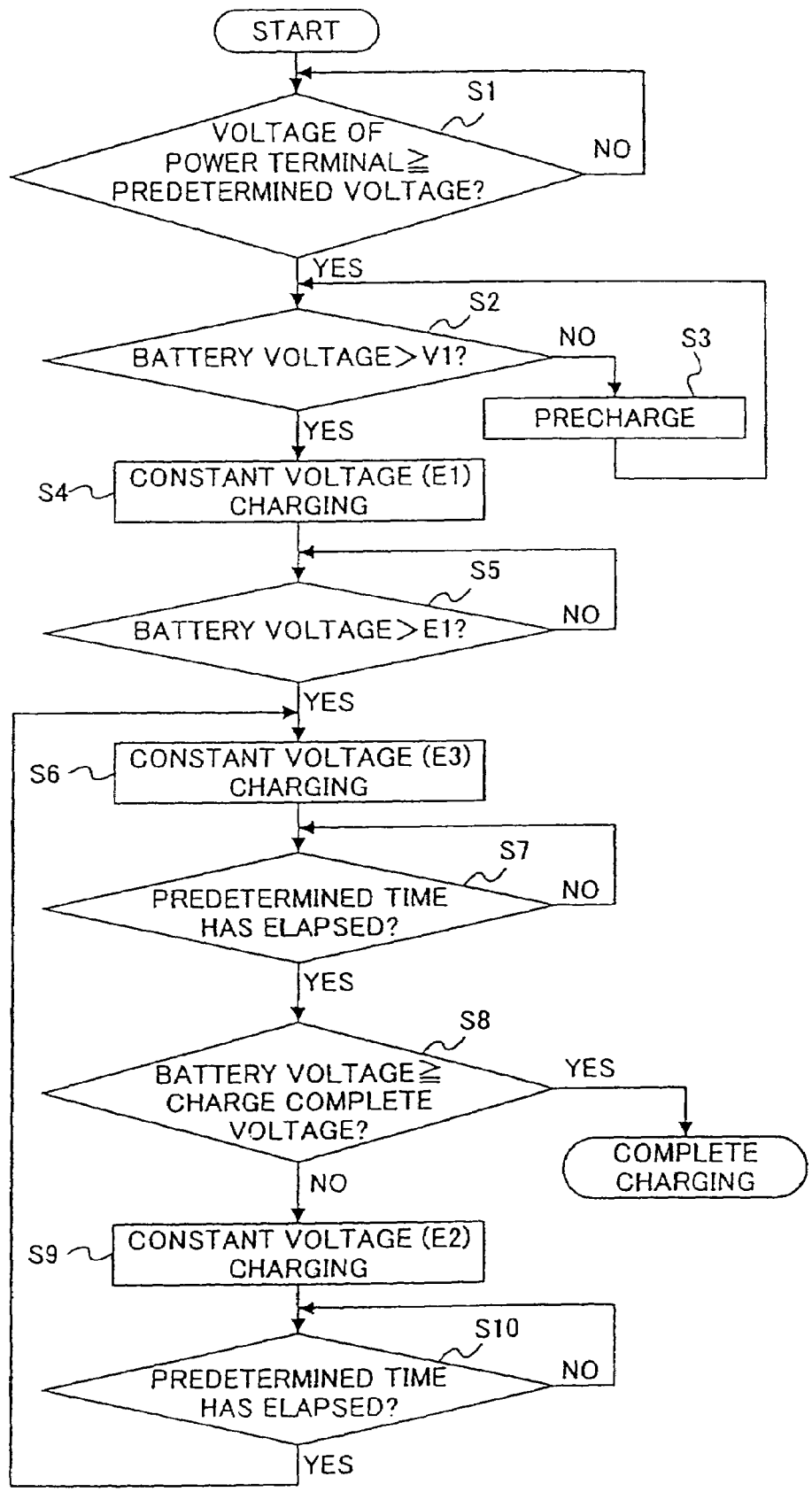
FIG. 3 is a flow chart for explaining an example of the operation of a charge control circuit 6 in FIG. 1.

FIG. 3 is a flow chart for explaining an example of the operation of the charge control circuit 6. A description will be given of the operation flow of the charge control circuit 6, with reference to FIG. 3. It should be noted that the process of each step is performed by charge control circuit 6 unless otherwise stated.

In FIG. 3, first, step S1 detects whether or not the voltage of the power terminal 31 is equal to or more than a predetermined voltage from a signal input by the adapter detection circuit 2. If it is impossible to detect that the voltage of the power terminal 31 is equal to or more than the predetermined voltage (NO in step S1), step S1 is repeated. If it is detected that the voltage of the power terminal 31 is equal to or more than the predetermined voltage (YES in step S1), step S2 determines whether or not the battery voltage Vb of the lithium ion battery 11 that is detected by the battery voltage detection circuit 3 exceeds the predetermined value V1.

In step S2, if the battery voltage Vb of the lithium ion battery 11 is equal to or less than the predetermined value V1 (NO in step S2), step S3 activates the constant-current circuit 5 so as to precharge the lithium ion battery 11, and the process returns to step S2. On the other hand, in step S2, if the battery voltage Vb of the lithium ion battery 11 exceeds the predetermined value V1 (YES in step S2), step S4 activates the operational amplifier 23, and at the same time, causes the voltage switch circuit 22 to select the constant-voltage E1 and to perform the constant-voltage charging with the constant-voltage E1 on the lithium ion battery 11.

Thereafter, step S5 determines whether or not the battery voltage Vb of the lithium ion battery 11 exceeds the constant-voltage E1. If the battery voltage Vb of the lithium ion battery 11 is equal to or less than the constant-voltage E1 (NO in step S5), step S5 is repeated. On the other hand, in step S5, if the battery voltage Vb of the lithium ion battery 11 exceeds the constant-voltage E1 (YES in step S5), step S6 causes the voltage switch circuit 22 to select the constant-voltage E3 and causes the constant-voltage circuit 4 to charge the lithium ion battery 11 with the constant-voltage E3.

Next, step S7 determines whether or not the predetermined time T1 has elapsed since the charging with the constant-voltage E3 is started. If the predetermined time T1 has not elapsed (NO in step S7), the charging with the constant-voltage E3 is continued until the predetermined time T1 has elapsed. In addition, in step S7, if the predetermined time T1 has elapsed (YES in step S7), the process proceeds to step S8. Step S8 determines whether or not the battery voltage Vb is equal to or more than the predetermined charge complete voltage Ve. If the battery voltage Vb is equal to or more than the charge complete voltage Ve (YES in step S8), the charging of the lithium ion battery 11 is completed and the process ends.

Further, in step S8, if the battery voltage Vb is less than the charge complete voltage Ve (No in step S8), the process proceeds to step S9. Step S9 causes the voltage switch circuit 22 to select the constant-voltage E2 and causes the constant-voltage circuit 4 to charge the lithium ion battery 11 with the constant-voltage E2. Next, step S10 determines whether or not the predetermined time T1 has elapsed since the charging with the constant-voltage E2 is started. If the predetermined time T1 has not elapsed (NO in step S10), the charging with the constant-voltage E2 is continued until the predetermined time T1 has elapsed. Further, in step S10, if the predetermined time T1 has elapsed (YES in step S10), the process returns to step S6.

As described above, the charging circuit according to the first embodiment of the present invention precharges the lithium ion battery 11 with the precharging current Ip from the constant-current circuit 5 when the battery voltage Vb is equal to or less than the predetermined value V1. When the battery voltage Vb exceeds the predetermined value V1, the charging circuit performs the constant-voltage charging with the constant-voltage E1 from the constant-voltage circuit 4. When the battery voltage Vb is equal to the constant-voltage E1, the charging circuit performs constant-voltage switching control on the voltage switch circuit 22 so that the pulse charging is carried out such that the constant-voltages E2 and E3 are alternately output from the constant-voltage circuit 4 in a constant cycle. Accordingly, by adding a simple circuit, when charging the lithium ion battery, it is possible to shorten the charging time and also to prevent noise generation in a frequency band that gives an influence on equipment using the charging circuit.

In the following, a description will be given of a second embodiment of the present invention, with reference to the drawings.

<Second Embodiment>

Figure 5:
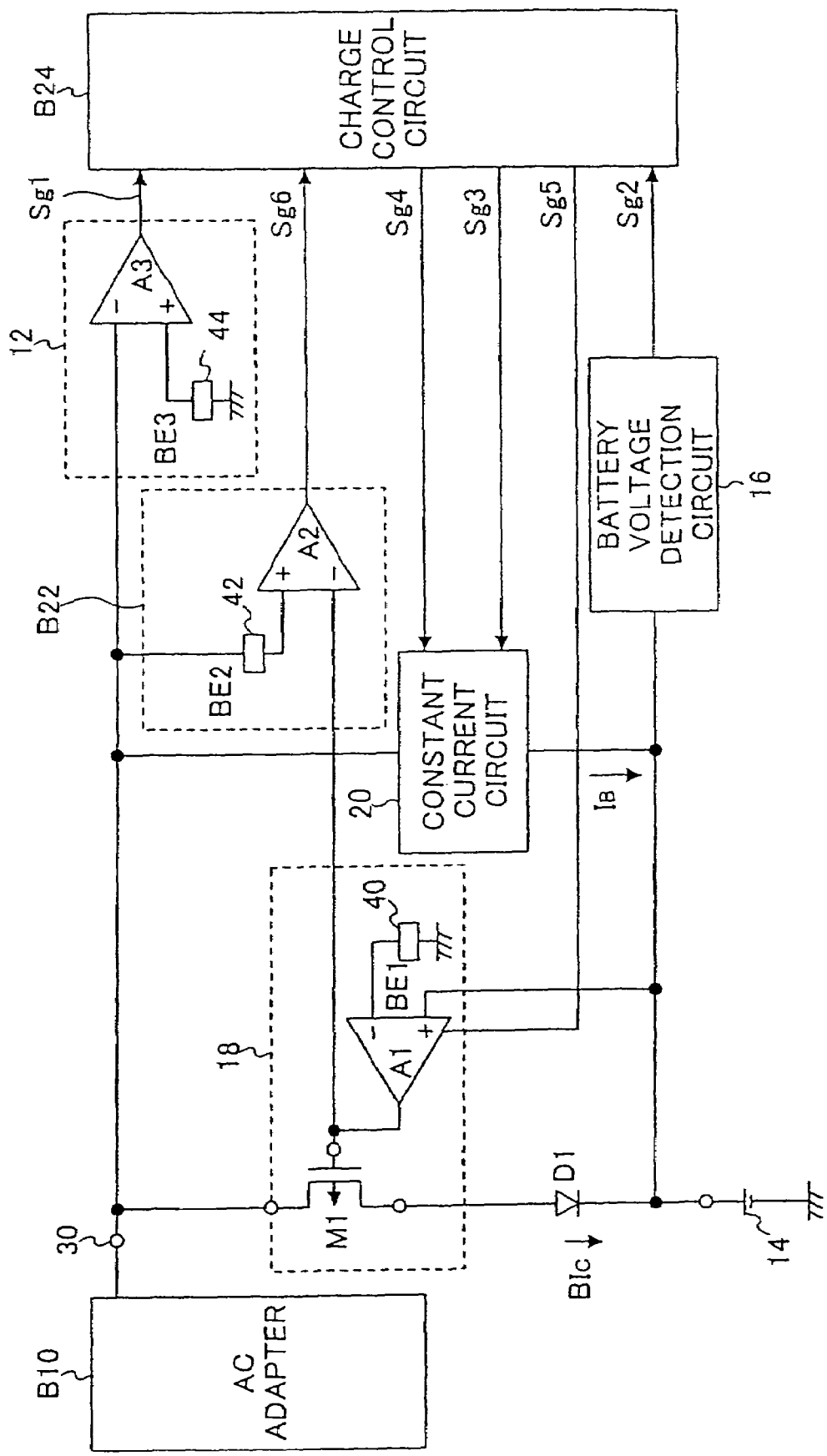
FIG. 5 is a charging circuit according to a second embodiment of the present invention.

FIG. 5 is a diagram showing a charging circuit according to the second embodiment of the present invention. In FIG. 5, the charging circuit includes an AC adapter B10 that supplies a charging current, an adapter detection circuit 12 detecting that the AC adapter B10 is connected, a battery voltage detection circuit 16 that detects the voltage of a secondary battery 14, a constant-voltage circuit 18 that performs a constant-voltage charge on the secondary battery 14, a constant-current circuit 20 that supplies a constant-current to the secondary battery 14, a gate voltage detection circuit B22 that detects the voltage of a control terminal of a control transistor M1, a diode D1 that blocks a current flowing from the secondary battery 14 to the AC adapter B10, and a charge control circuit B24 that performs drive control of the constant-voltage circuit 18 and the constant-current circuit 20. The AC adapter B10 is connected to a terminal 30. The constant-voltage circuit 18 includes a constant-voltage generation circuit 40 that generates a reference voltage BE1, the control transistor M1, and an operational amplifier A1. The gate voltage detection circuit B22 includes a constant-voltage generation circuit 42 that generates a reference voltage BE2 and an operational amplifier A2. The adapter detection circuit 12 includes a constant-voltage generation circuit 44 that generates a reference voltage BE3 and an operational amplifier A3. In addition, the diode D1 is connected between the control transistor M1 and the secondary battery 14. The diode D1 prevents a current from flowing back to the AC adapter B10 from the secondary battery 14 via the control transistor M1. Further, in FIG. 5, the control transistor M1 is shown as a p-channel metal-oxide semiconductor field-effect transistor (hereinafter referred to as a "pMOS transistor").

In the following, a description will be given of the operation of the charging circuit according to the second embodiment. When the AC adapter B10 that is a power source of the charging circuit is connected to the charging circuit via the terminal 30, and the voltage of an input terminal of the operational amplifier A3 connected to the terminal 30 is equal to or more than the predetermined reference voltage BE3, the adapter detection circuit 12 sends a predetermined signal Sg1 to the charge control circuit B24. Additionally, the battery voltage detection circuit 16 detects the battery voltage of the secondary battery 14, generates a battery voltage signal Sg2, and outputs the signal to the charge control circuit B24. The charge control circuit B24 is activated when the signal Sg1 is input thereto. The charge control circuit B24 outputs a constant-current control signal Sg3 to the constant-current circuit 20 when the battery voltage signal Sg2 is input thereto. The constant-current circuit 20 is activated when the constant-current control signal Sg3 is input thereto. The constant-current circuit 20 includes two power sources inside and can output one of two kinds of currents in a direction indicated by $I_B$ in FIG. 5. The charge control circuit B24 outputs a constant-current value switch signal Sg4 with the constant-current control signal Sg3 to the constant-current circuit 20, when the charge control circuit B24 detects that, from the battery voltage signal Sg2 that is input, the battery voltage of the secondary battery 14 is lower than a predetermined voltage BV1. This is for reducing the charge current, since a problem occurs when the secondary battery 14 is suddenly charged by a great current in a case where the battery voltage of the secondary battery 14 is lower than BV1, that is, the secondary battery 14 is in an over-discharged state. Hence, the constant-current circuit 20 outputs a current having a current value BI1, when the constant-current value switch signal Sg4 is input to the constant-current circuit 20. In a case of the lithium ion battery, the voltage BV1 is set to approximately 2.5 V, and generally, the current value BI1 ranges from a few to tens of milliamperes. As described above, charging of the secondary battery 14 is started when the constant-current control signal Sg3 is output to the constant current circuit 20.

The charge control circuit B24 determines that the secondary battery 14 is a normal battery and outputs the constant-current value switch signal Sg4 to the constant-current circuit 20, when the secondary battery 14 is charged by the current having the current value BI1, and the charge control circuit B24 detects that the battery voltage of the secondary battery 14 reaches the predetermined voltage BV1, according to the battery voltage signal Sg2 supplied from the battery voltage detection circuit 16. Hence, the constant-current circuit 20 outputs a current value BI2 that is larger than the current value BI1 to the secondary battery 14. The current value BI2 is equal to the full charge current that flows to the secondary battery 14 when the constant-voltage charge is completed. Further, the charge control circuit B24 outputs a charge control signal Sg5 to the constant-voltage circuit 18 so as to activate the constant-voltage circuit 18. The constant-voltage circuit 18 outputs a charge current to the secondary battery 14 in a direction indicated by $BI_C$ in FIG. 5. Subsequently, the secondary battery 14 is charged by the current output by both the constant-voltage circuit 18 and the constant-current circuit 20.

Thereafter, when the battery voltage of the secondary battery 14 is further raised and reaches a voltage BV2 that is approximately equal to the reference voltage BE1 of the constant-voltage circuit 18, the battery voltage of the secondary battery 14 is not raised anymore, maintained to be constant, and only the charging current decreases gradually. At this moment, the operational amplifier A1 is comparing the battery voltage of the secondary battery 14 with the reference voltage BE1, and is applying a positive gate voltage (control voltage) to a gate (control terminal) of the pMOS transistor M1 according to the difference. The higher the battery voltage of the secondary battery 14 is, the higher the applied gate voltage becomes. Thus, a drain current is gradually limited. That is, the charging current supplied to the secondary battery 14 is gradually decreased. In a case of the lithium ion battery, the voltage BV2 is set to approximately 4.2 V. When the voltage is further raised, a problem occurs since metallic lithium is separated inside the secondary battery 14. Even in a conventional constant-current·constant-voltage charge circuit, when the battery voltage of the secondary battery 14 reaches the voltage BV2, the constant-current charge is switched to the constant-voltage charge. Further, ideally, total charging current starts to be decreased simultaneously when the battery voltage of the secondary battery 14 reaches the voltage BV2. However, there is some time difference depending on the progress of chemical reaction inside the battery.

Figure 6A:
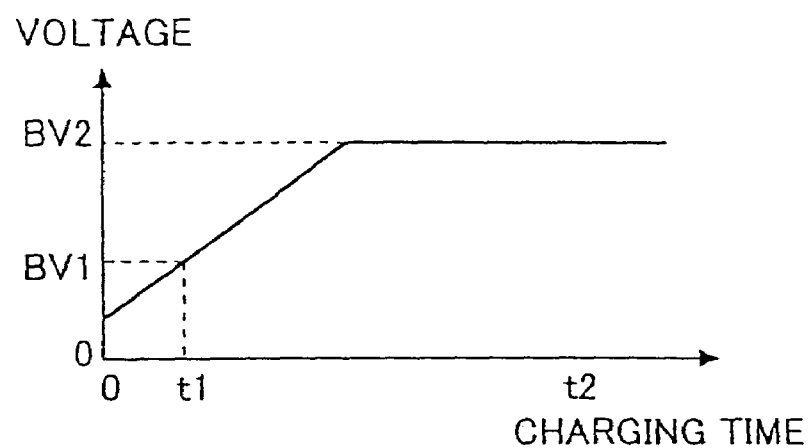
FIG. 6A is a diagram showing the variation of a voltage of the secondary battery with charging time in the circuit shown in FIG. 5.
Figure 6B:
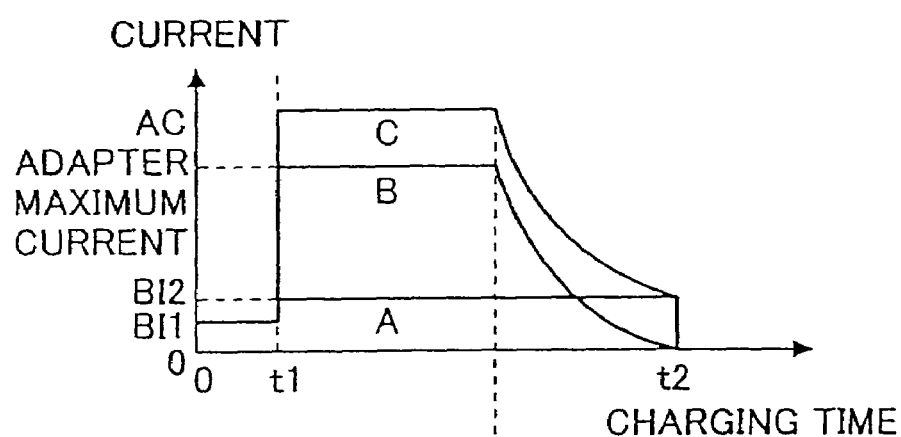
FIG. 6B is a diagram showing the variation of a charging current with charging time in the circuit shown in FIG. 5.
Figure 6C:
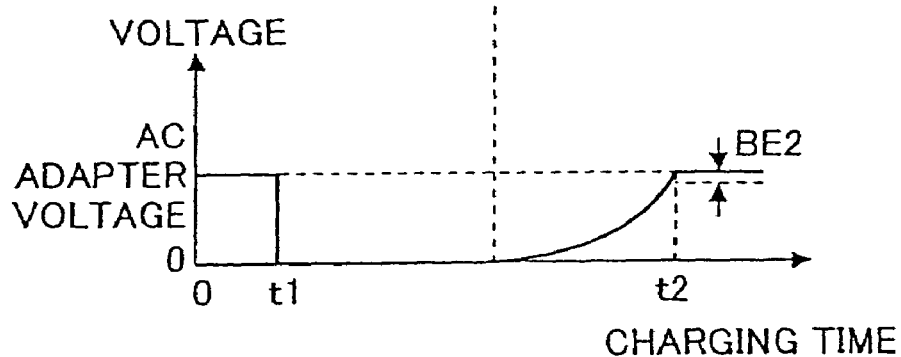
FIG. 6C is a diagram showing the variation of a gate voltage of a pMOS transistor with charging time in the circuit shown in FIG. 5.

FIGS. 6A, 6B and 6C are graphs diagrammatically showing the above-mentioned operation. FIG. 6A is a graph showing the variation of the battery voltage of the secondary battery 14 with charging time. FIG. 6B is a graph showing the variation of the charging current with the charging time. In addition, FIG. 6C is a graph showing the variation of the gate voltage of the pMOS transistor M1 with the charging time. FIG. 6B shows each variation of the current A (indicated by a bold line) output by the constant-current circuit 20, the charging current B output by the constant-voltage circuit 18, and a total charging current C obtained by adding the current output by the constant-current circuit 20 to the current output by the constant-voltage circuit 18. Referring to FIGS. 6A and 6B, the secondary battery 14 is charged by the current having the current value BI1 output from the constant-current circuit 20 until the voltage reaches BV1 (until charging time t1). When the battery voltage of the secondary battery 14 reaches BV1, the constant-current circuit 20 outputs the charging current having the current value BI2, and the constant-voltage circuit 18 also starts to output a charging current. The charging current output from the constant-voltage circuit 18 is a current that is, at first, limited by the current capacity of the AC adapter B10 or the current capacity of the pMOS transistor M1, whichever is smaller. FIG. 6B shows the charging current in a case where the current capacity of the AC adapter B10 is smaller, for example. The secondary battery 14 is charged by the currents output by both the constant-voltage circuit 18 and the constant-current circuit 20, and thus the battery voltage of the secondary battery 14 is raised and reaches the predetermined voltage BV2.

When a certain amount of time has elapsed after the battery voltage of the secondary battery 14 reaches the predetermined voltage BV2, the gate voltage of the pMOS transistor M1 starts to be increased gradually, and in response this increase, the current output from the constant-voltage circuit 18 starts to be decreased gradually. Then, as shown in FIG. 6C, at a charging time t2, the gate voltage of the pMOS transistor M1 is raised close to the AC adapter voltage. At this moment, the pMOS transistor of the constant-voltage circuit 18 is cut off, and the charging current output from the constant-voltage circuit 18 is stopped. In other words, the total charging current is only the current having the current value BI2 output from the constant-current circuit 20.

In the charging circuit according to this embodiment, since the current value BI2 is set equal to the value of the full charging current, it is possible to consider that the charging is completed when the pMOS transistor M1 of the constant-voltage circuit 18 is cut off, and only the current having the current value BI2 output from the constant-current circuit 20 flows to the secondary battery 14.

Accordingly, if the reference voltage BE2 of the gate voltage detection circuit B22 is set such that a voltage that is dropped to the lower value from the voltage of the AC adapter B10 by the reference voltage BE2 is equal to the gate voltage at which the pMOS transistor M1 is cut off, the gate voltage detection circuit B22 outputs a charge completion signal Sg6 to the charge control circuit B24, when the control transistor M1 is cut off, that is, the gate voltage of the pMOS transistor M1 input to one of the input terminals of the operational amplifier A2 is equal to the voltage that is dropped from the voltage of the AC adapter B10 by the reference voltage BE2. As described above, the gate voltage detection circuit B22 detects that a predetermined current flows to the secondary battery 14, by detecting the gate voltage of the pMOS transistor M1. Thus, the gate voltage detection circuit B22 can be called as a charging current detection circuit. When the charge completion signal Sg6 is input to the charge control circuit B24, the charge control circuit B24 outputs the charge control signal Sg5 and the constant-current control signal Sg3 to the constant-voltage circuit 18 and the constant-current circuit 20, respectively, and stops the operations of both circuits.

In the charging circuit according to this embodiment, a resistor for detecting the charge current is not required. Thus, there is no heat generation or power loss due to the resistor. Accordingly, it is possible to detect the full charge state with high accuracy. Further, it is possible to select the current value of the current output from the constant-current circuit 20 from among different current values. Therefore, it is possible to charge even an over-discharged battery and the like without adding a new circuit.

In addition, in the charging circuit according to this embodiment, the gate voltage detection circuit B22 sets the voltage that is dropped from the voltage of the AC adapter B10 by the reference voltage BE2 equal to the gate voltage at which the pMOS transistor M1 is cut off, by using the constant-voltage generation circuit 42 that generates the reference voltage BE2. However, this is the same thing as to set the charge complete voltage equal to the gate voltage at which the pMOS transistor M1 is cut off, by using the constant-voltage generation circuit 42 that generates the charge complete voltage.

Figure 7:
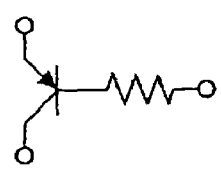
FIG. 7 is a diagram showing an alternative bipolar transistor.

Furthermore, it should be noted that a pMOS transistor is used for the control transistor M1 in FIG. 5, however, a similar effect can be obtained even when a bipolar PNP transistor as shown in FIG. 7 is used instead. In this case, the reference voltage BE2 of the gate voltage detection circuit B22 may be set such that the voltage dropped from the voltage of the AC adapter B10 by the reference voltage BE2 is equal to a base voltage at which the bipolar PNP transistor is cut off.

<Third Embodiment>

Figure 8:
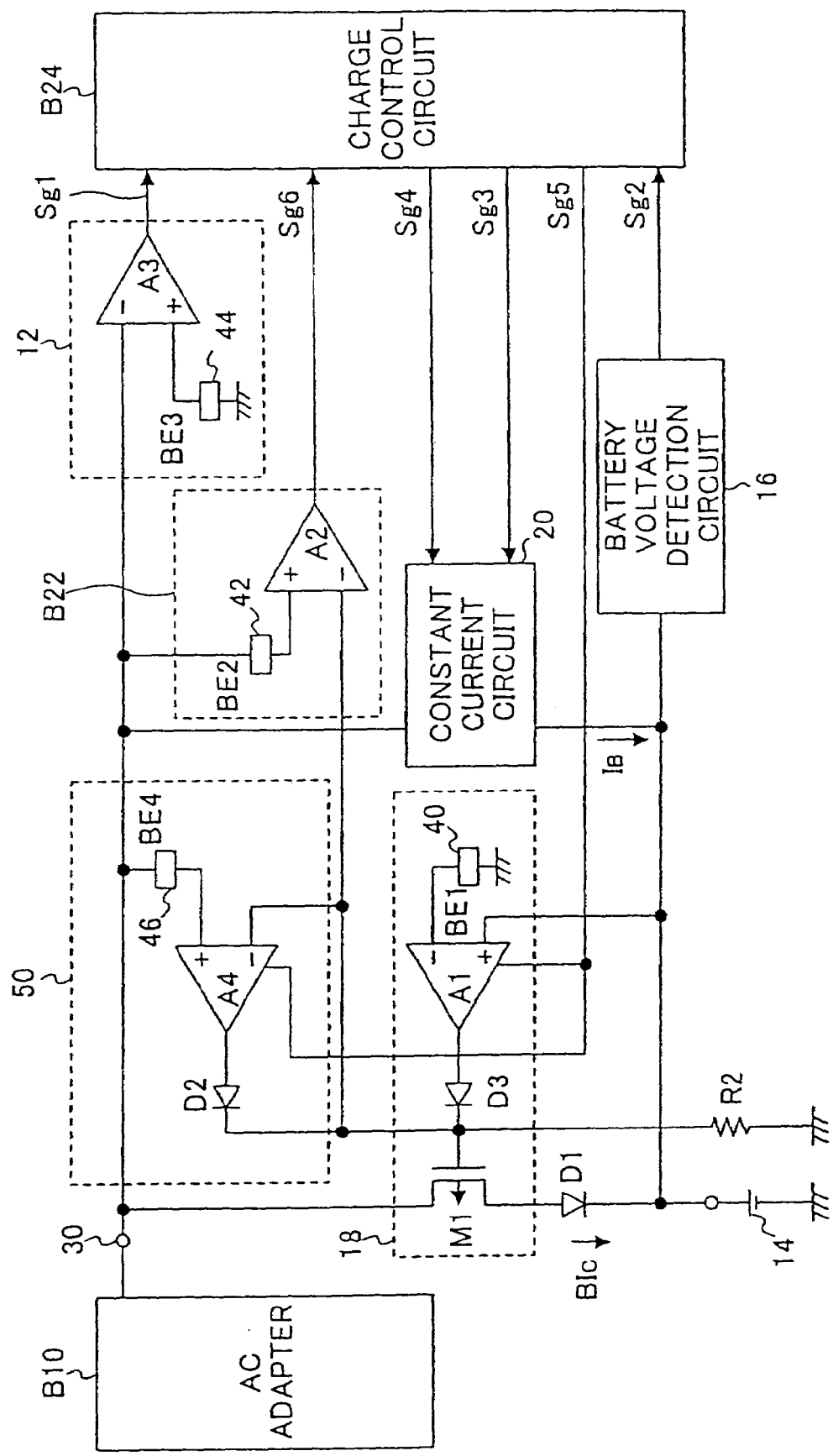
FIG. 8 is a charging circuit according to a third embodiment of the present invention.

FIG. 8 is a diagram showing a charging circuit for the secondary battery 14 according to a third embodiment of the present invention. In FIG. 8, those parts that are the same as those corresponding parts in FIG. 5 are designated by the same reference numerals, and a description thereof will be omitted. The charging circuit according the third embodiment further includes, in addition to the charging circuit shown in FIG. 5, a charge current control circuit 50 that controls a charging current output from the pMOS transistor M1, and a load resistor R2. Additionally, a diode D3 is connected between the operational amplifier A1 of the constant-voltage circuit 18 and the pMOS transistor M1. The charge current control circuit 50 includes a constant-voltage generation circuit 46, an operational amplifier A4 and a diode D2. One terminal of the load resistor R2 is connected to ground, and the other terminal is connected to a gate terminal of the pMOS transistor M1.

Figure 9A:
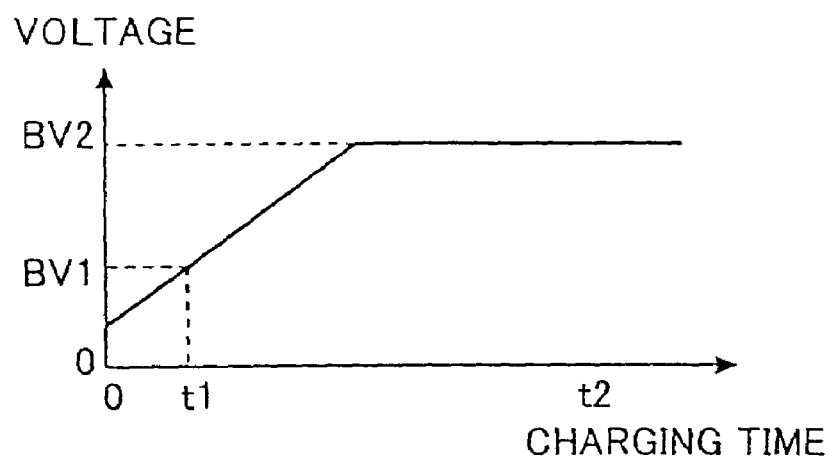
FIG. 9A is a diagram showing the variation of the battery voltage of the secondary battery with charging time in the circuit shown in FIG. 8.
Figure 9B:
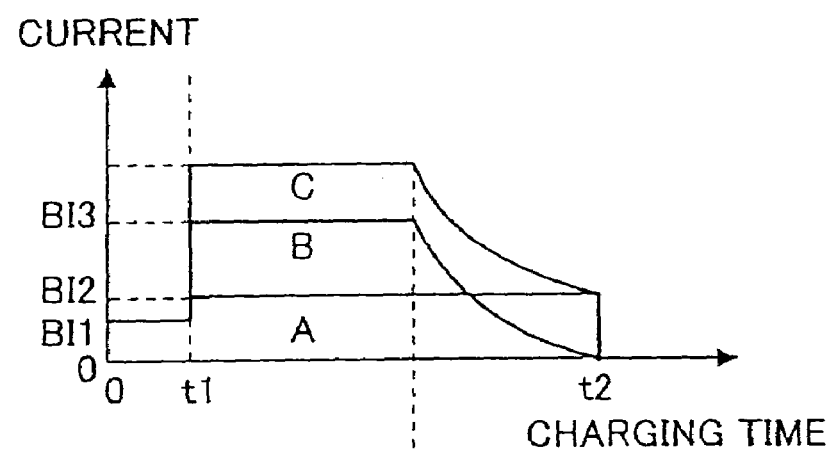
FIG. 9B is a diagram showing the variation of the charging current with charging time in the circuit shown in FIG. 8.
Figure 9C:
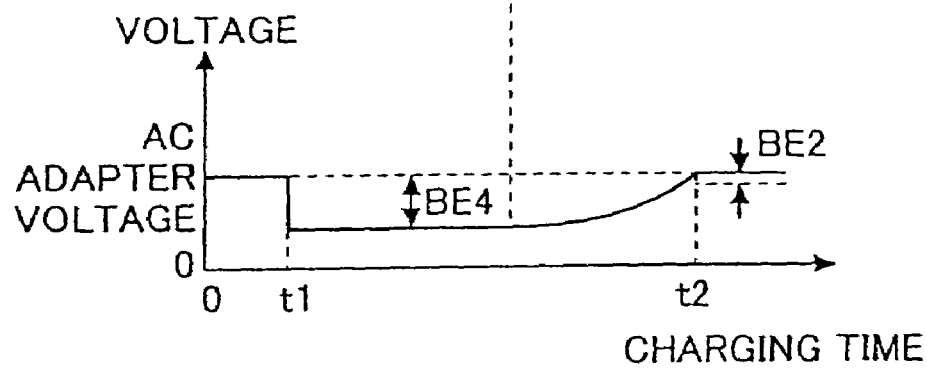
FIG. 9C is a diagram showing the variation of the gate voltage of the pMOS transistor with charging time in the circuit shown in FIG. 8.

FIGS. 9A, 9B and 9C show the variation of the battery voltage of the secondary battery 14 with the charging time, the variation of the charging current, and the variation of the gate voltage of the pMOS transistor M1, respectively. FIG. 9B shows the current A (indicated by a bold line) output from the constant-current circuit 20, the charging current B output from the constant-voltage circuit 18, and the total charging current C that is obtained by adding the current output from the constant-current circuit 20 to the current output from the constant-voltage circuit 18. The charging circuit according to the third embodiment operates similarly to the charging circuit according to the second embodiment, until the battery voltage of the secondary battery 14 reaches the predetermined voltage BV1 (until the charging time becomes t1). The charge control circuit B24 outputs the constant-current value switch signal Sg4 to the constant-current circuit 20, when detecting that the battery voltage of the secondary battery 14 reaches the predetermined voltage BV1 from the battery voltage signal Sg2 output from the battery voltage detection circuit 16. Hence, the constant-current circuit 20 outputs the current value BI2 that is larger than the current value BI1 to the secondary battery 14. Further, the charge control circuit B24 outputs the charge control signal Sg5 to the constant-voltage circuit 18 and the charge current control circuit 50 so as to activate the constant-voltage circuit 18 and the charge current control circuit 50, respectively.

At first, since the battery voltage of the secondary battery 14 is still low, the output of the operational amplifier A1 of the constant-voltage circuit 18 is approximately 0 V. On the other hand, the operational amplifier A4 of the charge current control circuit 50 compares the gate voltage of the pMOS transistor M1 with the voltage dropped from the voltage of the AC adapter B10 (the voltage of the terminal 30) by the reference voltage BE4, and outputs the voltage so that the gate voltage of the pMOS transistor M1 is maintained to be constant and equal to the voltage dropped from the voltage of the AC adapter B10 by the reference voltage BE4. At this moment, the diode D3 of the constant-voltage circuit 18 blocks the current flowing from the gate terminal of the pMOS transistor M1 to the operational amplifier A1. After all, the gate voltage of the pMOS transistor M1 is maintained to be constant, and the drain current of the PMOS transistor M1, that is, the charging current output from the constant-voltage circuit 18 is constant at the current value BI3.

However, due to the performance of the pMOS transistor M1, there is a case where the predetermined drain current does not flow even when the predetermined gate voltage is applied. Thus, as shown in FIG. 8, by arranging the load resistor R2, fine adjustment of the gate voltage is performed so that the predetermined drain current flows. As described above, the secondary battery 14 is charged by both of the constant current having the current value BI2 and the drain current having the current value BI3.

When the battery voltage of the secondary battery 14 is increased and reaches the predetermined voltage BV2, the output voltage of the operational amplifier A1 of the constant-voltage circuit 18 is increased, and the current starts to flow from the operational amplifier A1 to the gate terminal of the pMOS transistor M1 via the diode D3. Therefore, the gate voltage of the pMOS transistor M1 is increased. Instead, the output of the operational amplifier A4 of the constant-current control circuit 50 falls to approximately 0 V. Thus, the current stops to flow from the operational amplifier A4 to the gate voltage of the pMOS transistor M1 via the diode D2. When the gate voltage of the pMOS transistor M1 is increased, the drain current output from the pMOS transistor M1 decreases. As the secondary battery 14 is further charged, the gate voltage of the PMOS transistor M1 is further increased, and the PMOS transistor M1 is cut off. At this moment, the total current flowing to the secondary battery 14 has the current value BI2 that is equal to the full charging current flowing to the secondary battery 14 when the constant-voltage charge is completed.

When the reference voltage BE2 of the gate voltage detection circuit B22 is set such that the voltage dropped from the voltage of the AC adapter B10 by the reference voltage BE2 is equal to the gate voltage at which the pMOS transistor M1 is cut off, the gate voltage detection circuit B22 outputs the charge completion signal Sg6 to the charge control circuit B24 when the control transistor M1 is cut off. When the charge control signal Sg6 is input to the charge control circuit B24, the charge control circuit B24 outputs the charge control signal Sg5 and the constant-current control signal Sg3 to the constant-voltage circuit 18 and the constant-current circuit 20, respectively, and stops the operations of both circuits.

In the charging circuit according to this embodiment, even immediately after the constant-voltage circuit 18 is driven, it is possible to apply the predetermined gate voltage to the pMOS transistor M1. Accordingly, it is possible to supply the secondary battery 14 with the predetermined constant current that is not dependent on the current capacity of the AC adapter B10 or the current capacity of the pMOS transistor M1. Hence, even immediately after the constant-voltage circuit 18 is driven, it is possible to supply the secondary battery 14 with the charging current having a suitable current value that does not damage the secondary battery 14.

Additionally, in the charging circuit according to this embodiment, a resistor for detecting the charging current is not required. Thus, there is no heat generation or power loss due to the resistor. Accordingly, it is possible to detect the full charge state of the secondary battery with high accuracy. In addition, it is possible to select the current value of the current output from the constant-current circuit 20 from among different current values. Therefore, it is possible to charge even an over-discharged battery and the like without adding a new circuit.

Further, in the charging circuit according to the third embodiment, by using the constant-voltage generation circuit 42 that generates the reference voltage BE2, the gate voltage detection circuit B22 sets the voltage dropped from the voltage of the AC adapter B10 by the reference voltage BE2 equal to the gate voltage at which the pMOS transistor M1 is cut off. However, this is the same thing as to set the charge complete voltage equal to the gate voltage at which the pMOS transistor M1 is cut off, by using the constant-voltage generation circuit that generates the charge complete voltage. In addition, by using the constant-voltage generation circuit 46 that generates the reference voltage BE4, the charge current control circuit 50 sets the voltage dropped from the voltage of the AC adapter B10 by the reference voltage BE4 equal to the gate voltage of the pMOS transistor M1 that outputs the predetermined constant current. However, this is the same thing as to set, by using the constant-voltage generation circuit that generates a certain control voltage, the control voltage equal to the gate voltage of the pMOS transistor M1 that outputs the predetermined constant current.

In addition, in FIG. 8, the control transistor M1 is a pMOS transistor. However, similar effect can be obtained also by the bipolar PNP transistor as shown in FIG. 7. In this case, the reference voltage BE2 of the gate voltage detection circuit B22 may be set such that voltage dropped from the voltage of the AC adapter B10 by the reference voltage BE2 is equal to the base voltage of the bipolar PNP transistor at which the bipolar PNP transistor is cut off. Additionally, the reference voltage BE4 of the constant-voltage generation circuit 46 may be set such that a voltage dropped from the voltage of the AC adapter B10 by the reference voltage BE4 is equal to the base voltage of the bipolar PNP transistor that outputs a predetermined constant current.

Figure 10:
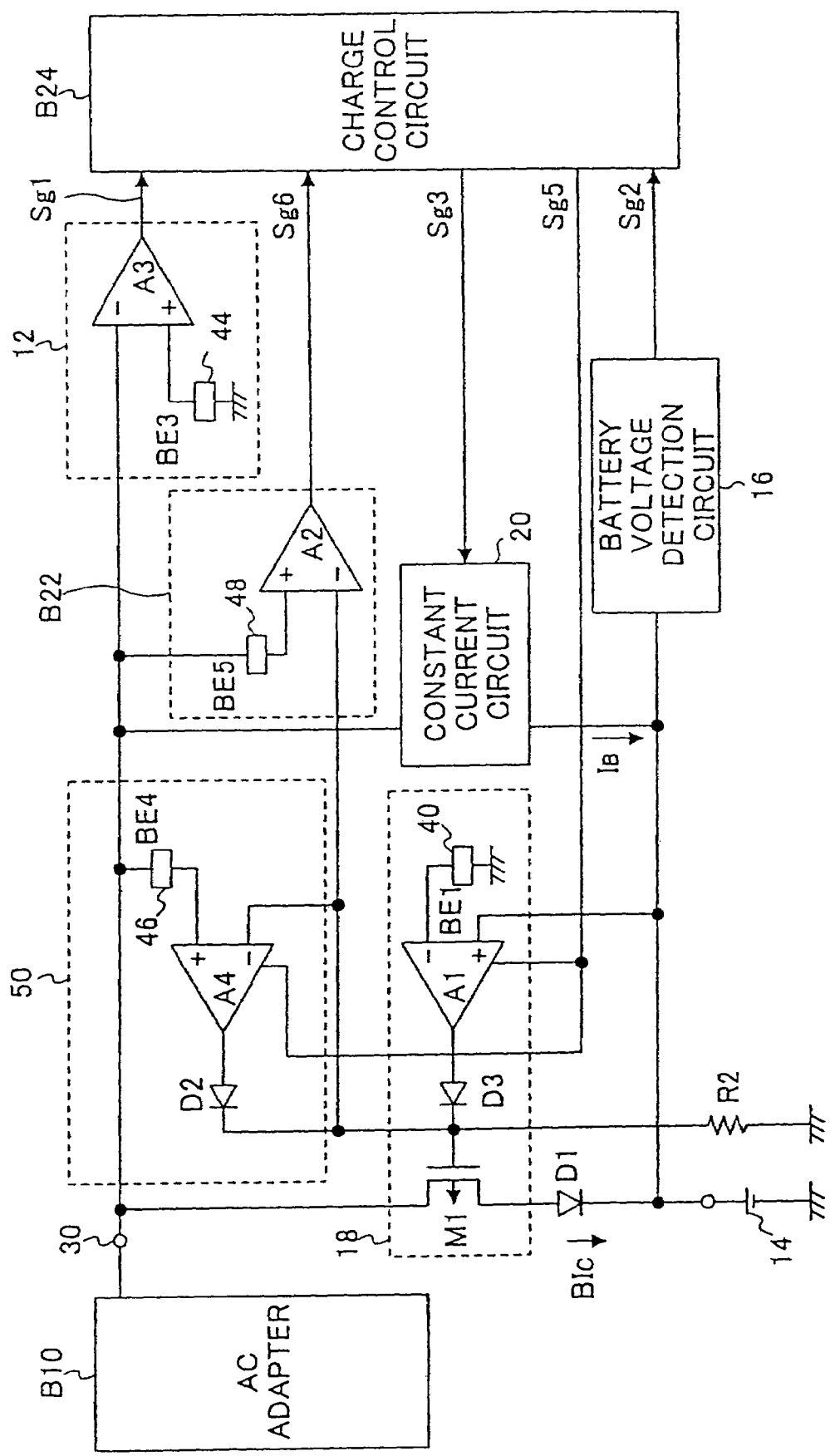
FIG. 10 is another charging circuit according to the third embodiment of the present invention.

Further, in the charging circuit according to this embodiment, the charge current control circuit 50 maintains the gate voltage of the pMOS transistor M1 to be constant, and passes the predetermined constant current to the secondary battery 14 via the pMOS transistor M1. However, another construction may be used as long as it is possible to pass the predetermined constant current to the secondary battery 14 via the pMOS transistor M1. A similar effect can be obtained even in such a case. However, when the load resistor R2 is arranged, as shown in FIGS. 8 and 10, it is easy to fine adjust the value of the gate voltage applied to the pMOS transistor M1. For example, even in a case where the pMOS transistor M1 is replaced with another PMOS transistor M1 of a different manufacturer, it is possible to simply adjust the gate voltage according to the performance of the pMOS transistor M1. Hence, it is possible to pass the predetermined constant current to the secondary battery 14, irrespective of the performance of the pMOS transistor M1.

Additionally, in the charging circuit in FIG. 8, the constant current circuit 20 may be a constant current circuit that outputs only the current value BI1. FIG. 10 is a diagram showing a charging circuit in such a case. The constant current circuit 20 has a single current source that outputs a current having a current value BI1, and is controlled by the constant-current control signal Sg3 that is output from the charge control circuit B24.

In a case where the battery voltage of the secondary battery 14 is lower than the predetermined voltage BV1, the constant-current circuit 20 is activated since the constant-current control signal Sg3 is input by the charge control circuit B24, and the secondary battery 14 is charged only with the current having the current value BI1. When the charge control circuit B24 detects, from the battery voltage signal Sg2 output by the battery voltage detection circuit 16, that the battery voltage of the secondary battery 14 reaches the predetermined voltage BV1, the charge control circuit B24 sends the constant-current control signal Sg3 to the constant-current circuit 20 so as to stop the operation of the constant-current circuit 20. Further, the charge control circuit B24 outputs the charge control signal Sg5 so as to activate the constant-voltage circuit 18 and the charge current control circuit 50. The operations of the charge current control circuit 50 and the constant-voltage circuit 18 are the same as the operations of those corresponding parts in FIG. 8.

Figure 4:
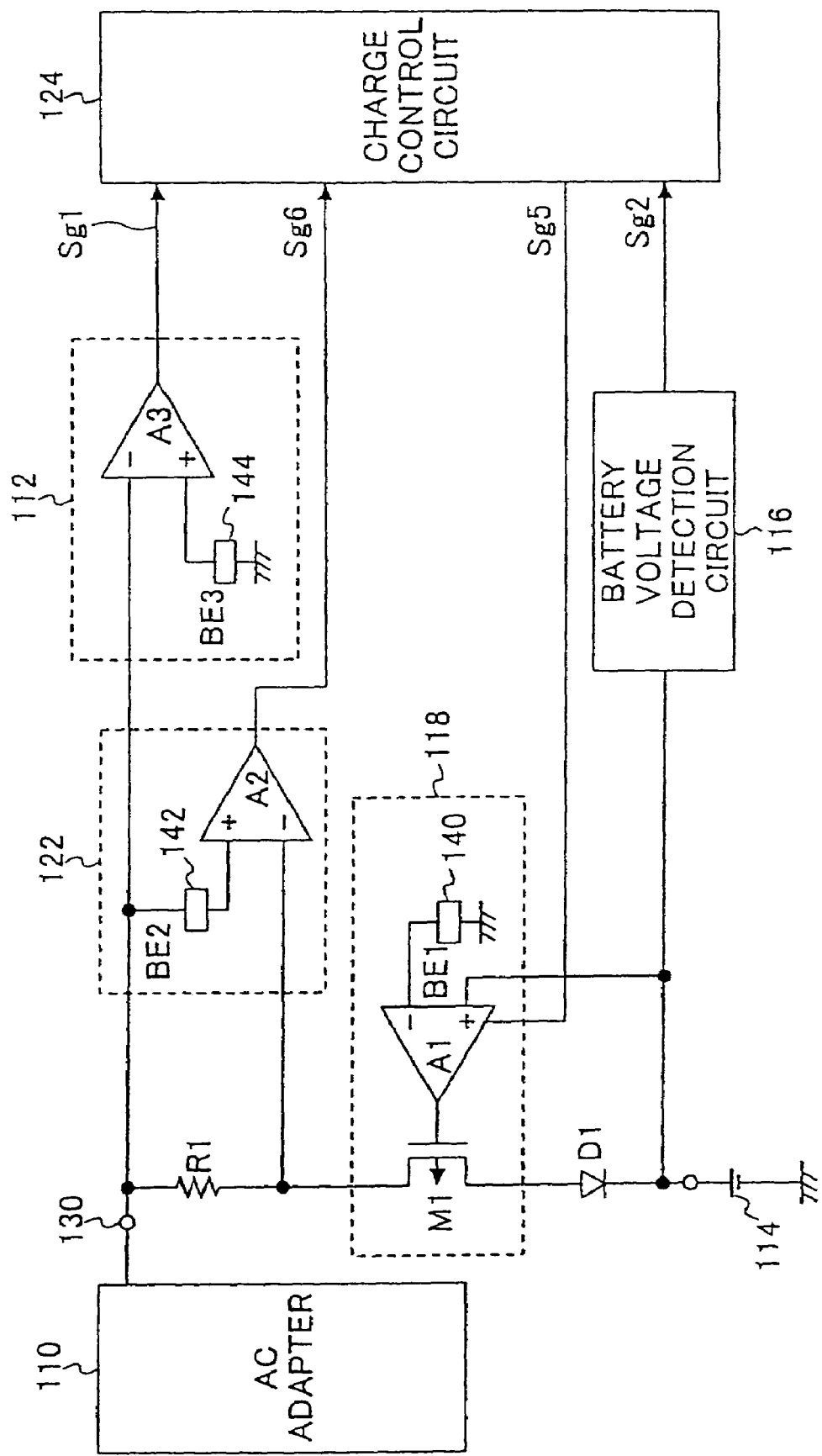
FIG. 4 is a diagram showing a conventional charging circuit.

In the charging circuit in FIG. 10, a reference voltage BE5 of the gate voltage detection circuit B22 is different from the reference voltage BE2 of the charging circuits in FIGS. 4 and 8. This reference voltage BE5 is set such that a voltage dropped from the voltage of the AC adapter B10 by the reference voltage BE5 is the same as the voltage applied to the gate terminal of the PMOS transistor M1 so that the drain current of the pMOS transistor M1 is equal to the current value 12. Hence, the charging is changed from the constant-current charge to the constant-voltage charge. When the gate voltage of the pMOS transistor M1 is increased and reaches the voltage that is decreased from the voltage of the AC adapter B10 by the reference voltage BE5, the gate voltage detection circuit B22 outputs the charge completion signal Sg6 to the charge control circuit B24. When the charge completion signal Sg6 is input, the charge control circuit B24 outputs the charge control signal Sg5 to the constant-voltage circuit 18 and the constant-current control circuit 50 so as to stop their operations.

In the charging circuit as shown in FIG. 10, the constant-current circuit 20 may include a single current source. Thus, the size of the circuit is reduced. As a result, the manufacturing cost is reduced.

The present invention is not limited to the specifically disclosed embodiments, and variations and modifications may be made without departing from the scope of the present invention.

The present application is based on Japanese priority applications No. 2001-279823 filed on Sep. 14, 2001 and No. 2001-287039 filed on Sep. 20, 2001, the entire contents of which are hereby incorporated by reference.

The invention claimed is:

1. A charging circuit for a secondary battery, comprising:
a constant-voltage circuit part that selects and outputs one constant voltage among a plurality of predetermined constant-voltages in response to an input control signal and charges the secondary battery by applying the selected constant voltage thereto;
a detection circuit part that detects a battery voltage of the secondary battery; and
a control circuit part that controls the selection of a constant voltage applied from said constant-voltage circuit part in response to the detected battery voltage from said detection circuit part,
said control circuit part causing said constant-voltage circuit part to charge the secondary battery by applying a predetermined first constant voltage thereto when the battery voltage of the secondary battery is equal to or less than the first constant voltage, and to charge the secondary battery by alternately applying thereto a predetermined second constant voltage and a predetermined third constant voltage that is lower than the second constant voltage in a constant cycle when the battery voltage of the secondary battery exceeds the first constant voltage;
wherein the second constant voltage is higher than the first constant voltage.

2. The charging circuit as claimed in claim 1, wherein the control circuit part detects completion of charging of the secondary battery and performs a predetermined charge complete operation when the battery voltage of the secondary battery exceeds a predetermined charge complete voltage while causing the constant-voltage circuit part to apply the third constant voltage to the secondary battery.

3. The charging circuit as claimed in claim 1, wherein the second constant voltage is equal to the first constant voltage.

4. The charging circuit as claimed in claim 1, further comprising:
a load circuit part that connects a load in parallel with the secondary battery according to the third constant voltage output from the constant-voltage circuit part.

5. The charging circuit as claimed in claim 1, wherein the constant-voltage circuit part comprises:
a constant-voltage generation circuit that generates and outputs the first constant voltage, the second constant voltage and the third constant-voltage;
a voltage switch circuit that, according to the control signal from the control circuit part, selects and outputs one of the first constant-voltage, the second constant voltage and the third constant voltage output from said constant-voltage generation circuit;
a voltage comparator that compares the constant voltage output from said voltage switch circuit with the battery voltage of the secondary battery and outputs a comparison signal according to a comparison result;
a control transistor that passes a current according to the comparison signal from a predetermined direct-current power source to the secondary battery; and
a diode that blocks a current flowing from the secondary battery to the predetermined direct-current power source via said control transistor.

6. A charging circuit charging a secondary battery, comprising:
a constant-voltage circuit part that is connected between an external direct-current power source and the secondary battery, and charges the secondary battery by applying a predetermined constant-voltage thereto;
a battery voltage detection circuit part that detects and outputs a battery voltage of the secondary battery;
a charge current detection circuit part that outputs a predetermined charge completion signal when a current output from said constant-voltage circuit part becomes a predetermined value; and
a charge control circuit part that stops an operation of said constant-voltage circuit part when the predetermined charge completion signal is input,
said constant-voltage circuit part comprising:
a constant-voltage generation circuit that generates and outputs the predetermined constant voltage;
a voltage comparator that compares the battery voltage of the secondary battery with the predetermined constant voltage, and outputs a comparison signal indicating a comparison result; and
a control transistor that passes a current according to the comparison signal indicating the comparison result from the external direct-current power source to the secondary battery, and
said charge current detection circuit part detecting a gate voltage of the control transistor and outputting the predetermined charge completion signal by determining, from the detected gate voltage that the current passed by said control transistor is a predetermined value.

7. The charging circuit as claimed in claim 6, further comprising:
a direct-current power source that supplies a charging current to the secondary battery.

8. The charging circuit as claimed in claim 6, wherein the charge current detection circuit part comprises:
a second constant-voltage generation circuit that generates and outputs a predetermined second constant voltage; and
a second voltage comparator that compares a voltage applied to a control terminal of the control transistor with the predetermined second constant voltage, and outputs the predetermined charge completion signal in a case where the voltage applied to the control terminal is equal to the predetermined second constant voltage, and
the predetermined second constant voltage is a voltage applied to the control terminal so that the current passed by the control transistor becomes the predetermined value.

9. The charging circuit as claimed in claim 6, wherein the constant-voltage circuit part further comprises:
a diode that blocks a current flowing to the voltage comparator.

10. The charging circuit as claimed in claim 9, further comprising:
a charge current control circuit part that controls the current output from the constant-voltage circuit part, wherein said charge current control circuit part performs operation control on the constant-voltage circuit part so that a maximum value of the current output from the constant-voltage circuit part becomes a predetermined value, and the charge control circuit part further stops an operation of said charge current control circuit part when the predetermined charge completion signal is input.

11. The charging circuit as claimed in claim 10, wherein the charge current control circuit part comprises:

a third constant-voltage generation circuit that generates and outputs a predetermined third constant voltage;

a third voltage comparator that compares a voltage applied to a control terminal of the control transistor with the predetermined third constant voltage, and outputs a comparison signal indicating a comparison result; and a second diode that blocks a current flowing from the control terminal to said third voltage comparator.

12. The charging circuit as claimed in claim 6, further comprising:

a constant-current circuit part that is connected in parallel with the constant-voltage circuit part and outputs a predetermined constant current to the secondary battery, wherein, when the battery voltage of the secondary battery is lower than a predetermined voltage, the charge control circuit part drives said constant-current circuit part, and when the battery voltage of the secondary battery is equal to or more than the predetermined voltage, the charge control circuit part stops said constant-current circuit part.

13. The charging circuit as claimed in claim 6, wherein the constant-voltage circuit part further comprises a third diode that blocks a current flowing from the secondary battery to the external direct-current power source via the control transistor.

* * * * *